US012272472B2

(12) United States Patent
Liao et al.

(10) Patent No.: US 12,272,472 B2
(45) Date of Patent: Apr. 8, 2025

(54) RARE EARTH PERMANENT MAGNET MATERIAL, RAW MATERIAL COMPOSITION, PREPARATION METHOD, APPLICATION, AND MOTOR

(71) Applicant: FUJIAN GOLDEN DRAGON RARE-EARTH Co., Ltd., Fujian (CN)

(72) Inventors: Zongbo Liao, Fujian (CN); Ying Luo, Fujian (CN); Qin Lan, Fujian (CN); Jiaying Huang, Fujian (CN)

(73) Assignee: FUJIAN GOLDEN DRAGON RARE-EARTH Co., Ltd., Fujian (CN)

( * ) Notice: Subject to any disclaimer, the term of this patent is extended or adjusted under 35 U.S.C. 154(b) by 451 days.

(21) Appl. No.: 17/600,103

(22) PCT Filed: Jul. 7, 2020

(86) PCT No.: PCT/CN2020/100591
§ 371 (c)(1),
(2) Date: Sep. 30, 2021

(87) PCT Pub. No.: WO2021/042864
PCT Pub. Date: Mar. 11, 2021

(65) Prior Publication Data

US 2022/0262550 A1 Aug. 18, 2022

(30) Foreign Application Priority Data

Sep. 3, 2019 (CN) ........................ 201910829486.2

(51) Int. Cl.
*H01F 1/057* (2006.01)
*H01F 41/02* (2006.01)

(52) U.S. Cl.
CPC ....... *H01F 1/0577* (2013.01); *H01F 41/0266* (2013.01); *H01F 41/0293* (2013.01)

(58) Field of Classification Search
None
See application file for complete search history.

(56) References Cited

U.S. PATENT DOCUMENTS 10,115,507 B2 10/2018 Nagata et al.
2013/0092868 A1* 4/2013 Nakajima ................ H01F 1/01 252/62.51 R (Continued)

FOREIGN PATENT DOCUMENTS

CN 101256861 A 9/2008
CN 102412044 A 4/2012

(Continued)

OTHER PUBLICATIONS

Oct. 9, 2020 International Search Report issued in International Patent Application No. PCT/CN2020/100591.

(Continued)

*Primary Examiner* — Xiaowei Su
(74) *Attorney, Agent, or Firm* — Houston Beshining Law Office PLLC; Liangang Ye

(57) ABSTRACT

A rare earth permanent magnet material, a raw material composition, a preparation method, an application, and a motor. The present rare earth permanent magnet material comprises the following ingredients in mass percentage: R 28.5-33.0 wt. %; RH>1.5 wt. %; Cu 0-0.08 wt. %, but not 0 wt. %; Co 0.5-2.0 wt. %; Ga 0.05-0.30 wt. %; B 0.95-1.05 wt. %; and the remainder being Fe and unavoidable impurities. The R-T-B system permanent magnet material has excellent properties and, under the condition that the content of heavy rare earth elements in the permanent magnetic material is 3.0-4.5 wt. %, Br≥12.78 kGs and Hcj≥29.55 kOe; under the condition that the content of heavy rare earth elements in the permanent magnet material is 1.5-2.5 wt. %, Br≥13.06 kGs and Hcj≥26.31 kOe.

15 Claims, 2 Drawing Sheets

(56) References Cited

U.S. PATENT DOCUMENTS

| | | | | |
|---|---|---|---|---|
| 2013/0154424 | A1* | 6/2013 | Nakajima | C22C 38/10 310/152 |
| 2018/0226189 | A1 | 8/2018 | Wu et al. | |

FOREIGN PATENT DOCUMENTS

| | | | |
|---|---|---|---|
| CN | 103805827 | A | 5/2014 |
| CN | 104064346 | A | 9/2014 |
| CN | 104674115 | A | 6/2015 |
| CN | 105655076 | A | 6/2016 |
| CN | 105957679 | A | 9/2016 |
| CN | 106782980 | A | 5/2017 |
| CN | 110571007 | A | 12/2019 |
| KR | 20130013011 | A | 2/2013 |
| WO | 2010063142 | A1 | 6/2010 |

OTHER PUBLICATIONS

Oct. 9, 2020 Written Opinion of the International Searching Authority issued in International Patent Application No. PCT/CN2020/100591.

* cited by examiner

RARE EARTH PERMANENT MAGNET MATERIAL, RAW MATERIAL COMPOSITION, PREPARATION METHOD, APPLICATION, AND MOTOR

The present application is a National Stage of International Application No. PCT/CN2020/100591, filed on Jul. 7, 2020, which claims the priority of Chinese Patent Application CN201910829486.2 filed on Sep. 3, 2019, the contents of which are incorporated herein by reference in their entireties.

TECHNICAL FIELD

The present disclosure relates to rare earth permanent magnet material, raw material composition, preparation method, application, and motor.

BACKGROUND

R-T-B based re earth permanent magnet materials are widely used in modern industry and electronics, such as electronic computers, automatic control systems, electric motors and generators, nuclear magnetic resonance cameras, audio devices, material separation devices, communication equipment and many other fields. With the development of ye application areas and demanding and changing application conditions, there is an increasing demand for products with high coercivity.

At present, the intrinsic coercivity (Hcj for short) of magnets can generally be is proved by adding high melting point metals (generally refers to metals with melting points higher than 1.538° C.) to the raw material formulation of R-T-B based rare earth permanent magnet materials, for example adding elements such as Nb, Zr, Ti, Cr, V, W and Mo. The addition of these high melting point metal elements can further improve the Hcj of the magnet by pinning the grain boundaries and refining the grains, but with the addition of high melting point metal elements imposes more requirements on the sintering process, making the sintering more difficult and costly, and leads to a low remanence (Br) of the magnet.

It has also been shown that if low melting point metals are sintered directly, intergranular compounds (abnormal grain growth) that re not conducive to magnetic properties may be generated and the sintering process may lead to poor sintering densities (poor sintering), resulting in low Br of the permanent magnet material.

It can be seen that it is difficult to maintain high levels of Br and Hcj simultaneously in the magnets of permanent magnet materials with current formulations with low melting point metals. Therefore, how to obtain an R-T-B based rare earth permanent magnet material with high Hcj and high Br is a technical problem to be solved urgently in this field.

Content of the Present Invention

The technical problem to be solved in the present disclosure is for overcoming the defects of the prior art in which the Br and Hcj of the R-T-B based rare earth permanent magnet materials are difficult to achieve simultaneous improvement, and thus a rare earth permanent magnet material, a raw material composition, a preparation method, an application, and a motor are provided. The R-T-B based permanent magnet material in the present disclosure has excellent properties, Br≥12.78 kGs and Hcj≥29.55 kOe under the condition that the content of heavy rare earth elements is 3.0-45 wt. %; Br≥13.06 kGs and Hcj 26.31 kOe under the condition that the content of heavy rare earth elements is 1.5-2.5 wt. %; which is capable of achieving simultaneous improvement of Br and Hcj. Compared with conventional formulations, in the formulation of the R-T-B based permanent magnet material in the present disclosure, high melting point metals are not added and only a small amount of low inciting point metals are used to improve the Hcj of magnet while minimizing the effect of the magnet on Br. In addition, the preparation of the R-T-B based permanent magnet material in the present disclosure achieves low temperature sintering and reduces energy consumption; through the design of the formulation composition and process, the $R_x$—$(B_{1-a-b-c}$—$Ga_a$—$Cu_b$-$T_c)_y$ crystalline phase is formed at the grain boundaries, which improves the grain boundary morphology and forms continuous grain boundary channels to further improve the magnet performance.

The present disclosure provides an R-T-B based permanent magnet material, comprising the following components in mass percentage:

R: 28.5-33.0 wt. %;

RH: >1.5 wt. %;

Cu: 0-0.08 wt. %, but not 0 wt. %;

Co: 0.5-2.0 wt. %;

Ga: 0.05-0.30 wt %;

B: 0.95-1.05 wt. %;

the remainder being Fe and unavoidable impurities; wherein:

R is a rare earth element and comprises at least Nd and RH; RH is a heavy rare earth element.

Preferably; in the present disclosure, the R-T-B based permanent magnet material does not contain high melting point metal elements. Wherein, the high inciting point metal element generally refers to a metal element having a melting point higher than 1538° C., for example one or more of Ti, V, Zr, Nb, Cr, W and Mo.

Preferably, in the present disclosure, the R-T-B based permanent magnet material comprises $R_2T_{14}B$ grains and grain boundary phase among $R_2T_{14}B$ grains, the composition of the grain boundary phase is $R_x$—$(B_{1-a-b-c}$—$Ga_a$—$Cu_b$-$T_c)_y$, wherein: T is Fe and Co, 2b<a<3.5b, 1/2c<a+b, 50 at %<x<65 at %, 35 at %<y<50 at %, and at % refers to the atomic percentage of each element in the grain boundary phase.

During the development process, the inventors found that the formation of $R_x$—$(B_{1-a-b-c}$—$Ga_a$—$Cu_b$-$T_c)_y$ grain boundary phase can increase the wettability of grain boundaries, improve the grain boundary morphology, and can provide continuous grain boundary channels for the diffusion process, thus Hcj is improved and permanent magnet materials with high Br and high Hcj are obtained.

In addition, the inventors found that the $R_x$—$(B_{1-a-b-c}$—$Ga_a$—$Cu_b$-$T_c)_y$ grain boundary phase has a more balanced composition of R and T, and has excellent miscibility effect with both Nd-rich and B-rich phases at grain boundaries, reducing the agglomeration of the grain boundary phase and forming a uniformly distributed grain boundary layer to achieve a good demagnetization coupling effect, which can further improve the Hcj of magnets.

Wherein, in the grain boundary phase, x is preferably 55-60 at %, for example 55.6 at %, 56.7 at %, 56.9 at %, 57 at %, 58.6 at %, 59 at %, 59.1 at % or 59.5 at %, and at % refers to the atomic percentage of R in the grain boundary phase.

Wherein, in the grain boundary phase, y is preferably 40-45 at %, for example 40.5 at %, 40.9 at %, 41 at %, 41.4 at %, 43 at %, 43.1 at %, 43.3 at %, or 44.4 at %, and at % refers to the atomic percentage of "B, Ga, Cu, Fe, and Co" in the grain boundary phase.

Wherein, in the grain boundary phase, a is preferably 0.23-0.24, for example 0.23, 0.235 or 0.24, and a refers to the atomic ratio of Ga in the elements of "B, Ga, Cu, Fe and Co".

Wherein, in the grain boundary phase, b is preferably 0.1-0.115, for example 0.1, 0.103, 0.11 or 0.115, and b refers to the atomic ratio of Cu in the elements of "B, Ga, Cu, Fe and Co".

Wherein, in the grain boundary phase, c is preferably 0.64-0.65, for example 0.64, 0.644 or 0.65, and c refers to the atomic ratio of "Fe and Co" in the elements of "B, Ga, Cu, Fe and Co".

Wherein, preferably, the $R_x$—$(B_{1-a-b-c}$—$Ga_a$—$Cu_b$-$T_c)_y$ is $R_{55.6}$—$(B_{0.01}$—$Ga_{0.235}$—$Cu_{0.115}$-$T_{0.64})_{44.4}$, $R_{56.9}$—$(B_{0.02}$—$Ga_{0.23}$—$Cu_{0.11}$-$T_{0.64})_{43.1}$, $R_{59}$—$(B_{0.02}$—$Ga_{0.24}$—$Cu_{0.1}$-$T_{0.64})$—$Cu_{0.1}$-$T_{0.64})_{41}$, $R_{59.1}$—$B_{0.02}$—$Ga_{0.23}$—$Cu_{0.11}$-$T_{0.64})_{40.9}$, $R_{56.7}$—$(B_{0.02}$—$Ga_{0.23}$—$Cu_{0.1}$-$T_{0.65})_{43.3}$, $R_{57}$—$(B_{0.02}$—$Ga_{0.23}$—$Cu_{0.1}$-$T_{0.65})_{43}$, $R_{58.6}$—$(B_{0.02}$—$Ga_{0.23}$—$Cu_{0.11}$-$T_{0.64})_{41.4}$-$T_{0.64})_{41.4}$ or $R_{59.5}$—$(B_{0.023}$—$Ga_{0.23}$—$Cu_{0.103}$-$T_{0.644})_{40.5}$.

In the present disclosure, R can further comprise a rare earth element conventional in the art, for example Pr.

In the present disclosure, RH can be a heavy rare earth element conventional in the art, for example Dy and/or Tb, preferably Tb.

In the present disclosure, the content of R is preferably 28.5-32.0 wt % or 30.5-33.0 wt. %, for example 28.94 wt. %, 30.53 wt. %, 30.66 wt. %, 31.09 wt. %, 31.83 wt,%, 31.92 wt. %, 32.23 wt,% or 32.86 wt. %, and the percentages refers to the mass percentage in the R-T-B based permanent magnet material.

In the present disclosure, the content of Nd is preferably 24.4-30.5 wt. %, for example 24.4-28.0 wt. % or 28.0-30.5 wt. %, and for another example, 24.46 wt. %, 26.4 wt,%, 27.39 wt. %, 2.94 wt. %, 28.36 wt. %, 29.58 wt. %, 30.24 wt. % or 30.36 wt. %, and the percentages refers to the mass percentage in the R-T-B based permanent magnet material.

In the present disclosure, the content of RH is preferably 1.5-4.5 wt. %, more preferably 1.5-2.5 wt. % or 3.0-4.5 wt. %, for example 1.99 wt. %, 2.25 wt. %, 2.3 wt. %, 2.5 wt. %, 3.7 wt. %, 3.98 wt. %, 4.13 wt. % or 4.48 wt. %, and the percentages refers to the mass percentage in the R-T-B based permanent magnet material.

When RH comprises Tb, preferably, the content of Tb is 1.5-4.5 wt. %, for example 1.99 wt. %, 2.01 wt. %, 2.25 wt. %, 2.3 wt. %, 2.99 wt. %, 3.19 wt. %, 3.61 wt. % or 3.98 wt. %.

When RH comprises Dy, preferably, the content of Dy is 0.45-1.0 wt. %; for example 0.5 wt. %, 0.52 wt. %, 0.51 wt. %, 0.99 wt. % or 0.49 wt. %; and the percentages refers to the mass percentage in the R-T-B based permanent magnet material.

In the present disclosure, the content of Cu is preferably 0.01-0.08 wt. %, 0.04-0.08 wt. % or 0.05-0.08 wt. %, for example 0.01 wt. %, 0.05 wt. %, 0.06 wt. %, 0.07 wt. % or 0.08 wt. %, and the percentages refers to the mass percentage in the R-T-B based permanent magnet material.

In the present disclosure, the content of Co is preferably 0.78-2.0 wt. %, for example 1.0-2.0 wt. %, and for another example 0.79 wt. %, 0.99 wt. %, 1 wt. %, 1.39 wt. %, 1.58 wt. %, 1.6 wt. % or 2 wt. %, and the percentages refers to the mass percentage in the R-T-B based permanent magnet material.

In the present disclosure, the content of Ga is preferably 0.05 or 0.1-0.3 wt. %, for example 0.1 wt. %, 0.2 wt. % or 0.3 wt. %, and the percentages refers to the mass percentage in the R-T-B based permanent magnet material.

In the present disclosure, the content of B is preferably 0.95-1.04 wt. %, for example 0.95 wt. %, 0.98 wt. %, 0.99 wt. % or 1.04 wt. %, and the percentages refers to the mass percentage in the R-T-B based permanent magnet material.

In the present disclosure, preferably, the R-T-B based permanent magnet material comprises the following components: 28.5-32.0 wt. % of R; 3.0-4.5 wt. % of RH; 0-0.08 wt. % but not 0 wt. % of Cu; 1.0-2.0 wt. % of Co; 0.05-0.30 wt. % of Ga; 0.95-1.05 wt. % of B; the remainder being Fe and unavoidable impurities; and the percentages refers to the mass percentage in the R-T-B based permanent magnet material.

In the present disclosure, preferably, the R-T-B based permanent magnet material comprises the following components: 28.5-32.0 wt. % of R; 3.2-4.5 wt. % of RH; 0.04-0.08 wt. % of Cu; 1.0-2.0 wt. % of Co; 0.10-0.30 wt. % of Ga; 0.95-1.05 wt. % of B; the remainder being Fe and unavoidable impurities, and the percentages refers to the mass percentage in the R-T-B based permanent magnet material.

In the present disclosure, preferably, the R-T-B based permanent magnet material comprises the following components: 24.4-28.0 wt. % of Nd; 3.0-4.0 wt. % of Tb; 0.5-1.0 wt. % of Dy; 0.01-0.08 wt. % of Cu; 1.0-2.0 wt. % of Co; 0.05-0.30 wt. % of Ga; 0.95-1.05 wt. % of B; the remainder being Fe and unavoidable impurities, and the percentages refers to the mass percentage in the R-T-B based permanent magnet material.

In a preferred embodiment of the present disclosure, the R-T-B based permanent magnet material comprises the following components: 24.46 wt. % of Nd, 3.98 wt. % of Tb, 0.50 wt. % of Dy, 0.07 wt. % of Cu, 2.00 wt. % of Co, 0.30 wt. % of Ga and 0.95 wt. % of B, the remainder being Fe and unavoidable impurities, and the percentages refers to the mass percentage in the R-T-B based permanent magnet material.

In a preferred embodiment of the present invention, the R-T-B based permanent magnet material comprises the following components: 26.40 wt. % of Nd, 3.61 wt. % of Tb, 0.52 wt. % of Dy, 0.06 wt. % of Cu, 1.58 wt. % of Co, 0.20 wt. % of Ga and 0.98 wt. % of B, the remainder being Fe and unavoidable impurities, and the percentages refers to the mass percentage in the R-T-B based permanent magnet material.

In a preferred embodiment of the present invention, the R-T-B based permanent magnet material comprises the following components: 27.39 wt. % of Nd, 3.19 wt. % of Tb, 0.51 wt. % of Dy, 0.05 wt. % of Cu, 1.39 wt. % of Co, 0.10 wt. % of Ga and 0.99 wt. % of B, the remainder being Fe and unavoidable impurities, and the percentages refers to the mass percentage in the R-T-B based permanent magnet material.

In a preferred embodiment of the present invention, the R-T-B based permanent magnet material comprises the following components: 27.94 wt. % of Nd, 2.99 wt. % of Tb, 0.99 wt. % of Dy, 0.01 wt. % of Cu, 1.00 wt. % of Co, 0.05 wt. % of Ga and 1.04 wt. % of B; the remainder being Fe and unavoidable impurities, and the percentages refers to the mass percentage in the R-T-B based permanent magnet material.

In the present disclosure, preferably, the R-T-B based permanent magnet material comprises the following components: 30.5-33.0 wt. % of R; RH >1.5 wt. %; 0-0.08 wt.

% of Cu, but not 0 wt. %; 0.78-2.0 wt. % of Co; 0.05-0.30 wt. % of Ga; 0.95-1.05 wt. % of B; the remainder being Fe and unavoidable impurities, and the percentages refers to the mass percentage in the R-T-B based permanent magnet material.

In the present disclosure, preferably, the R-T-B based permanent magnet material comprises the following components: 30.5-33.0 wt. % of R; 1.5-2.5 wt. % of RH; 0.04-0.08 wt. % of Cu; 0.78-1.6 wt. % of Co; 0.10-0.30 wt. % of Ga; 0.95-1.0 wt. % of B; the remainder being Fe and unavoidable impurities, and the percentages refers to the mass percentage in the R-T-B based permanent magnet material.

In the present disclosure, preferably, the R-T-B based permanent magnet material comprises the following components: 28.0-30.5 wt. % of Nd; 1.5-2.5 wt. % of T: 0-0.5 wt. % of Dy; 0.01-0.08 wt. % of Cu; 0.78-2.0 wt. % of Co; 0.05-0.30 wt. % of Ga; 0.95-1.05 wt. % of B; the remainder being Fe and unavoidable impurities, and the percentages refers to the mass percentage in the R-T-B based permanent magnet material.

In a preferred embodiment of the present disclosure, the R-T-B based permanent magnet material comprises the following components: 28.36 wt. % of Nd, 2.30 wt. % of T, 0.08 wt. % of Cu, 2.00 wt. % of Co, 0.30 wt. % of Ga and 0.95 wt. % of B, the remainder being Fe and unavoidable impurities, and the percentages refers to the mass percentage in the R-T-B based permanent magnet material.

In a preferred embodiment of the present disclosure, the R-T-B based permanent magnet material comprises the following components: 29.58 wt. % of Nd, 2.25 wt. % of Tb, 0.06 wt. % of Cu, 1.60 wt. % of Co, 0.20 wt. % of Ga and 0.98 wt. % of B, the remainder being Fe and unavoidable impurities, and the percentages refers to the mass percentage in the R-T-B based permanent magnet material.

In a preferred embodiment of the present disclosure, the R-T-B based permanent magnet material comprises the following components: 30.24 wt. % of Nd, 1.99 wt. % of Tb, 0.05 wt. % of Cu, 0.99 wt. % of Co, 0.10 wt. % of Ga and 0.99 wt. % of B, the remainder being Fe and unavoidable impurities, and the percentages refers to the mass percentage in the R-T-B based permanent magnet material.

In a preferred embodiment of the present disclosure, the R-T-B based permanent magnet material comprises the following components: 30.36 wt. % of Nd, 2.01 wt. % of Tb, 0.49 wt. % of Dy, 0.01 wt. % of Cu, 0.79 wt. % of Co, 0.05 wt. % of Ga and 1.04 wt. % of B, the remainder being Fe and unavoidable impurities, and the percentages refers to the mass percentage in the R-T-B based permanent magnet material.

The present disclosure further provides an R-T-B based permanent magnet material, the R-T-B based permanent magnet material comprises $R_2T_{14}B$ grains and grain boundary phase among $R_2T_{14}B$ grains, the composition of the grain boundary phase is $R_x$—$(B_{1-a-b-c}$—$Ga_a$—$Cu_b$-$T_c)_y$, wherein: T is Fe and Co, 2b<a<3.5b, 1/2c<a+b, 50 at %<x<65 at %, 35 at %<y<50 at %, and at % refers to the atomic percentage of each element in the grain boundary phase;

R is a rare earth element and comprises at least Nd and RH; RH is a heavy rare earth element.

Wherein, x, y, a, b and c are as previously described.

Wherein, preferably, the $R_x$—$(B_{1-a-b-c}$—$Ga_a$—$Cu_b$-$T_c)_y$ is $R_{55.6}$—$(B_{0.01}$—$Ga_{0.235}$—$Cu_{0.115}$-$T_{0.64})_{44.4}$, $R_{56.9}$—$(B_{0.02}$—$Ga_{0.23}$—$Cu_{0.11}$-$T_{0.64})_{43.1}$, $R_{59}$—$(B_{0.02}$—$Ga_{0.24}$—$Cu_{0.1}$-$T_{0.64})_{41}$, $R_{59.1}$—$(B_{0.02}$—$Ga_{0.23}$—$Cu_{0.11}$-$T_{0.64})_{40.9}$, $R_{56.7}$—$(B_{0.02}$—$Ga_{0.23}$—$Cu_{0.1}$-$T_{0.65})_{43.3}$, $R_{57}$—$(B_{0.02}$—$Ga_{0.23}$—$Cu_{0.1}$-$T_{0.65})_{43}$, $R_{58.6}$—$(B_{0.02}$—$Ga_{0.23}$—$Cu_{0.11}$-$T_{0.64})_{41.4}$ or $R_{59.5}$—$(B_{0.02}$—$Ga_{0.23}$—$Cu_{0.103}$-$T_{0.644})_{40.5}$.

Wherein, preferably, the R-T-B based permanent magnet materials comprises the following components in mass percentage: R: 28.5-33.0 wt. %; RH: >1.5 wt. %; Cu: 0-0.08 wt. %, but not 0 wt. %; Co: 0.5-2.0 wt. %; Ga: 0.05-4.30 wt. %; B: 0.95-1.05 wt. %; the remainder being Fe and unavoidable impurities: R is a rare earth element, and comprise at least Nd and RH; and RH is a heavy rare earth element.

The contents of R, RH, Cu, Co, Ga, B and Nd are as previously described.

The present disclosure further provides a raw material composition of a R-T-B based permanent magnet material, comprising the following components in mass percent:

R: 28.5-32.5 wt. %;

RH: >1.2 wt. %;

Cu: 0-0.08 wt. %, but not 0 wt. %;

Co: 0.5-2.0 wt. %;

Ga: 0.05-0.30 wt. %;

B: 0.95-1.05 wt. %;

the remainder being Fe and unavoidable impurities; wherein.

R is a rare earth element and comprises at least Nd and RH; RH is a heavy rare earth element.

In the present disclosure, R can further comprise a rare earth element conventional in the art, for example Pr.

In the present disclosure, RH can be a heavy rare earth element conventional in the art, for example Dy and/or Tb, preferably Tb.

In the present disclosure, the content of R is preferably 28.5-31.5 wt. %, 30.5-32.5 wt. % or 30.0-32.5 wt. %, for example 28.5 wt. %, 30.1 wt. %, 30.5 wt. %, 30.7 wt. %, 31.5 wt. %, 31.8 wt. % or 32.5 wt. %, and the percentage refers to the mass percentage in the raw material composition of the R-T-B based permanent magnet material.

In the permanent magnet material of the present disclosure, if the content of R is lower than 28.5 wt. %, sufficient rare earth-rich phase cannot be obtained, and the requirements for sintering process are comparatively high, which may cause difficulties in sintering, resulting in lower performance of the permanent magnet material; if the content of R is higher than 32.5 wt. %, then the content of rare earth is high, but it is difficult to achieve higher Br, resulting in a waste of rare earth resources.

In the present disclosure, the content of Nd is preferably 24.5-30.5 wt. %, for example 24.5-28.0 wt. % or 28.0-30.5 wt. %, and for another example 24.5 wt. %, 26.5 wt. %, 27.5 wt. %, 28.0 wt. %, 28.5 wt. %, 29.7 wt. %, 30.3 wt. % or 30.5 wt. %, and the percentage refers to the mass percentage in the raw material composition of the R-T-B based permanent magnet material.

In the present disclosure, the content of RH content is preferably 1.2-4.5 wt. %, more preferably 1.2-2.0 wt. % or 3.0-4.5 wt. %, for example 1.5 wt. %, 1.8 wt. %, 2.0 wt. %, 3.2 wt. %, 3.5 wt. %, 3.6 wt. % or 4.0 wt. %, and the percentage refers to the mass percentage in the raw material composition of the R-T-B based permanent magnet material.

When RH comprises Tb, preferably, the content of Tb is 1.2-4.5 wt. %, for example 1.5 wt. %, 1.8 wt. %, 2 wt. %, 3 wt. %, 3.2 wt. %, 3.6 wt. % or 4 wt. %, and the percentage refers to the mass percentage in the raw material composition of the R-T-B based permanent magnet material.

When RH comprises Dy, preferably, the content of Dy is 0-0.5 wt. %, for example 0.5 wt. %.

When RH comprises Tb and Dy, preferably: the content of Tb is 1.2-3.0 wt. % and the content of Dy is 0-0.5 wt. %, for example, 3.0 wt. % of Tb and 0.5 wt. % of Dy, or, 1.5 wt.

% of Tb and 0.5 wt. % of Dy; the percentage refers to the mass percentage in the raw material composition of the R-T-B based permanent magnet material.

In the present disclosure, the content of Cu is preferably 0.01-0.08 wt. %, 0.04-0.08 wt. % or 0.05-0.08 wt. %, for example 0.01 wt. %, 0.04 wt. %, 0.06 wt. % or 0.08 wt. %, and the percentage refers to the mass percentage in the raw material composition of the R-T-B based permanent magnet material.

In the permanent magnet material of the present disclosure, if Cu is not comprised, the $R_x$—($B_{1-a-b-c}$—$Ga_a$—$Cu_b$-$T_c$)$_y$ phase cannot be formed and a permanent magnet material with high Hcj cannot be obtained; if the content of Cu is higher than 0.08 wt. %, the volume fraction of main phase may be affected and a permanent magnet material with high Br cannot be obtained.

In the present disclosure, the content of Co is preferably 0.8-2.0 wt. %, for example 1.0-2.0 wt. %, and for another example 0.8 wt. %, 1.0 wt. %, 1.4 wt. %, 1.6 wt. % or 2.0 wt. %, and the percentage refers to the mass percentage in the raw material composition of the R-T-B based permanent magnet material.

In the present disclosure, the content of Ga is preferably 0.05 or 0.1-0.3 wt. %, for example 0.1 wt. %, 0.2 wt. % or 0.3 wt. %, and the percentage refers to the mass percentage in the raw material composition of the R-T-B based permanent magnet material.

In the permanent magnet material of the present disclosure, if the content of Ga is lower than 0.05 wt. %, then the $R_x$—($B_{1-a-b-c}$—$Ga_a$—$Cu_b$-$T_c$)$_y$ grain boundary phase cannot be formed effectively and a permanent magnet material with high Hcj cannot be obtained; if the content of Ga is higher than 0.3 wt. %, then the volume fraction of main phase may be affected and a permanent magnet material with high Br cannot be obtained.

In the present disclosure, the content of B is preferably 0.95-1.0 or 1.05 wt. %, for example 0.95 wt. %, 0.98 wt. % or 1.0 wt. %, and the percentage refers to the mass percentage in the raw material composition of the R-T-B based permanent magnet material.

In the permanent magnet material of the present disclosure, the content of B is closely related to the volume fraction of main phase and can influence the formation of the $R_x$—($B_{1-a-b-c}$—$Ga_a$—$Cu_b$-$T_c$)$_y$ grain boundary phase. If the content of B is lower than 0.95 wt. %, then the $R_2T_{17}$ phase may be formed and the volume fraction of main phase will be reduced, and the permanent magnet material with high Hcj and high Br cannot be obtained. If the content of B is higher than 1.05 wt. %, then too much B-rich phase will be generated and the performance of the permanent magnet material will be reduced.

In the present disclosure, preferably, the raw material composition of the R-T-B based permanent magnet material comprises the following components: 28.5-31.5 wt. % of R; 3.0-4.5 wt. % of RH: 0-0.08 wt. % but not 0 wt. % of Cu; 1.0-2.0 wt. % of Co; 0.05-0.30 wt. % of Ga; 0.95-1.05 wt. % of B; the remainder being Fe and unavoidable impurities; and the percentage refers to the mass percentage in the raw material composition of the R-T-B based permanent magnet material.

In the present disclosure, preferably, the raw material composition of the R-T-B based permanent magnet materials comprises the following components: 28.5-31.5 wt. % of R, 3.2-4.5 wt. % of RH, 0.04-0.08 wt. % of Cu, 1.0-2.0 wt. % of Co, 0.10-0.30 wt. % of Ga and 0.95-1.0 wt. % of B: the remainder being Fe and unavoidable impurities, and the percentage refers to the mass percentage in the raw material composition of the R-T-B based permanent magnet material.

In the present disclosure, preferably, the raw material composition of the R-T-B based permanent magnet materials comprises the following components: 24.5-28.0 wt. % of Nd, 3.0-4.0 wt. % of Tb, 0-0.5 wt. % of Dy, 0.01-0.08 wt. % of Cu, 1.0-2.0 wt. % of Co, 0.05-0.30 wt. % of Ga and 0.95-1.05 wt. % of B; the remainder being Fe and unavoidable impurities, and the percentage refers to the mass percentage in the raw material composition of the R-T-B based permanent magnet material.

In a preferred embodiment of the present disclosure, the raw material composition of the R-T-B based permanent magnet materials comprises the following components: 24.5 wt. % of Nd, 4 wt. % of Tb, 0.08 wt. % of Cu, 2 wt. % of Co, 0.3 wt. % of Ga and 0.95 wt. % of B, the remainder being Fe and unavoidable impurities, and the percentage refers to the mass percentage in the raw material composition of the R-T-B based permanent magnet material.

In a preferred embodiment of the present disclosure, the raw material composition of the R-T-B based permanent magnet materials comprises the following components: 26.5 wt. % of Nd, 3.6 wt. % of Tb, 0.06 wt. % of Cu, 1.6 wt. % of Co, 0.2 wt. % of Ga and 0.98 wt. % of B, the remainder being Fe and unavoidable impurities, and the percentage refers to the mass percentage in the raw material composition of the R-T-B based permanent magnet material.

In a preferred embodiment of the present disclosure, the raw material composition of the R-T-B based permanent magnet materials comprises the following components: 27.5 wt. % of Nd, 3.2 wt. % of Tb, 0.04 wt. % of Cu, 1.4 wt. % of Co, 0.1 wt. % of Ga and 1 wt. % of B, the remainder being Fe and unavoidable impurities, and the percentage refers to the mass percentage in the raw material composition of the R-T-B based permanent magnet material.

In a preferred embodiment of the present disclosure, the raw material composition of the R-T-B based permanent magnet materials comprises the following components: 28 wt. % of Nd, 3 wt. % of Tb, 0.5 wt. % of Dy, 0.01 wt. % of Cu, 1 wt. % of Co, 0.05 wt. % of Ga and 1.05 wt. % of B, the remainder being Fe and unavoidable impurities, and the percentage refers to the mass percentage in the raw material composition of the R-T-B based permanent magnet material.

In the present disclosure, preferably, the raw material composition of R-T-B based permanent magnet materials comprises the following components: 30.5-32.5 wt. % of R; RH>1.2 wt. %; 0-0.08 wt. % but not 0 wt. % of Cu: 0.8-2.0 wt. % of Co; 0.05-0.30 wt. % of Ga; 0.95-1.05 wt. % of B; the remainder being Fe and unavoidable impurities, and the percentage refers to the mass percentage in the raw material composition of R-T-B based permanent magnet material.

In the present disclosure, preferably, the raw material composition of R-T-B based permanent magnet materials comprises the following components: 30.5-32.5 wt. % of R, 1.2-2.0 wt. % of RH, 0.04-0.08 wt. % of Cu, 0.8-1.6 wt. % of Co, 0.10-0.30 wt. % of Ga and 0.95-1.0 wt. % of B; the remainder being Fe and unavoidable impurities, and the percentage refers to the mass percentage in the raw material composition of R-T-B based permanent magnet material.

In the present disclosure, preferably, the raw material composition of R-T-B based permanent magnet materials comprises the following components: 28.5-30.5 wt. % of Nd, 1.2-2.0 wt. % of Tb, 0-0.5 wt. % of Dy, 0.01-0.08 wt. % of Cu, 0.8-2.0 wt. % of Co, 0.05-0.30 wt. % of Ga and 0.95-1.05 wt. % of B; the remainder being Fe and unavoidable impurities, and the percentage refers to the mass percentage in the raw material composition of R-T-B based permanent magnet material.

In a preferred embodiment of the present disclosure, the raw material composition of R-T-B based permanent magnet material comprises the following components: 28.5 wt. % of Nd, 2.0 wt. % of Tb, 0.08 wt. % of Cu, 2.0 wt. % of Co, 0.3 wt. % of Ga and 0.95 wt. % of B, the remainder being Fe and unavoidable impurities, and the percentage refers to the mass percentage in the raw material composition of R-T-B based permanent magnet material.

In a preferred embodiment of the present disclosure, the raw material composition of R-T-B based permanent magnet material comprises the following components: 29.7 wt. % of Nd, 1.8 wt. % of Tb, 0.06 wt. % of Cu, 1.6 wt. % of Co, 0.2 wt. % of Ga and 0.98 wt. % of B, the remainder being Fe and unavoidable impurities, and the percentage refers to the mass percentage in the raw material composition of R-T-B based permanent magnet material.

In a preferred embodiment of the present disclosure, the raw material composition of R-T-B based permanent magnet material comprises the following components: 30.3 wt. % of Nd, 1.5 wt. % of Tb, 0.04 wt. % of Cu, 1 wt. % of Co, 0.1 wt. % of Ga and 1.0 wt. % of B, the remainder being Fe and unavoidable impurities, and the percentage refers to the mass percentage in the raw material composition of R-T-B based permanent magnet material.

In a preferred embodiment of the present disclosure, the raw material composition of R-T-B based permanent magnet material comprises the following components: 30.5 wt. % of Nd, 1.5 wt. % of Tb, 0.5 wt. % of Dy, 0.01 wt. % of Cu, 0.8 wt. % of Co, 0.05 wt. % of Ga and 1.05 wt. % of B, the remainder being Fe and unavoidable impurities, and the percentage refers to the mass percentage in the raw material composition of R-T-B based permanent magnet material.

The present disclosure further provides a preparation method for a R-T-B based permanent magnet material, comprising the following steps: molten liquid of the raw material composition of R-T-B based permanent magnet material is subjected to casting, decrepitation, pulverization, forming, sintering and grain boundary diffusion treatment, and the R-T-B based permanent magnet material is obtained; wherein:

the sintering is carried out sequentially in the following steps: first stage sintering, second stage sintering and cooling;

the temperature of the first stage sintering is ≤1040° C.;

the second stage sintering is carried out at an increased temperature on the basis of the first stage sintering with a temperature difference of ≥5-10° C., the rate of temperature increase is ≥5° C./min and the time of the second stage sintering is ≤1 h;

the rate of cooling is ≥7° C./min and the end point of cooling is ≤100° C.

In the present disclosure, the molten liquid of the raw material composition of R-T-B based permanent magnet materials can be prepared by conventional methods in the art, for example, melting in a high frequency vacuum induction melting furnace. The vacuum level in the melting furnace can be $5\times10^{-2}$ Pa. The temperature of the melting can be 1500° C. or less.

In the present disclosure, the process of the casting can be a conventional casting process in the art, for example: in an Ar gas atmosphere (e.g. $5.5\text{-}10^{4}$ Pa in an Ar gas atmosphere), cooling at a rate of $10^{2}$° C./sec–$10^{4}$° C./sec.

In the present disclosure, the process of decrepitation can be a conventional decrepitation process in the art, for example, being subjected to hydrogen absorption, dehydrogenation and cooling treatment.

Wherein, the hydrogen absorption can be carried out at a hydrogen pressure of 0.15 MPa.

Wherein, the dehydrogenation can be carried out under the condition of heating up while vacuum-pumping.

In the present disclosure, the process of pulverization can be a conventional pulverization process in the art, for example jet mill pulverization.

Wherein, the jet mill pulverization can be carried out under a nitrogen atmosphere with an oxidizing gas content of 150 ppm or less. The oxidizing gas refers to oxygen or moisture content.

Wherein, the pressure in pulverization chamber for jet mill pulverization can be 0.38 MPa.

Wherein, the time of jet mill pulverization can be 3 hours.

Wherein, after the pulverization, a lubricant, for example zinc stearate, can be added according to conventional means in the art. The addition amount of the lubricant can be 0.10-0.15%, for example 0.12%, by weight of the mixed powder.

In the present disclosure, the process of the forming can be a conventional forming process in the art, for example a magnetic field forming method or a hot pressing and hot deformation method.

In the present disclosure, the sintering can be carried out under vacuum conditions, for example under a vacuum of $5\times10^{-3}$ Pa.

In the present disclosure, before the first stage sintering, preheating can be further carried out according to conventional means in the art. The temperature of the preheating can be 300-600° C. The time of the preheating can be 1-2 h. Preferably, the preheating is carried out for 1 h each at a temperature of 300° C. and 600° C. in sequence.

In the present disclosure, the temperature of the first stage sintering is preferably 1000-1030° C., for example 1030° C.

In the present disclosure, the time of the first stage sintering is preferably ≥2 h, for example 3h.

In the present disclosure, preferably, the temperature difference in the second stage sintering is ≥5-10° C. and ≤20° C., for example 10° C.

In the present disclosure, the time of the second stage sintering is preferably 1 h.

In the present disclosure, in the process of the sintering, the rate of the cooling is preferably 10° C./min.

In the present disclosure, in the process of the sintering, the end point of the cooling is preferably 100° C.

During the development process, the inventors found that a small amount of residual B is diffusely distributed at the grain boundaries during the first stage sintering, which can promote the formation of the grain boundary phase $R_x$—$(B_{1-a-b-c}$—$Ga_a$—$Cu_b$-$T_c)_y$. With the combination of the two-stage sintering process and the rapid cooling process, not only can the denseness of main phase be improved, but also the rapid change of temperature provides pressure for the grain boundaries, which can make the grain boundary phases spread out and distribute evenly, reaching an effect of achieving the best microstructure morphology with a small amount of grain boundary phases.

During the development process, the inventors further found that if only the process of the first stage sintering is used, the magnet may not be dense enough and the morphology of grain boundary phase may not be ideal to obtain a permanent magnet material with high Br and high Hcj. If only the process of the second stage sintering is used, it may cause abnormal growth of grains, resulting in deterioration of magnet properties.

In the present disclosure, Ar gas can be introduced to make the air pressure reach 0.1 MPa before cooling.

In the present disclosure, the grain boundary diffusion treatment can be carried out by a process conventional in the art, for example, substance containing Dy or Tb is attached to the surface of the R-T-B based permanent magnet material by evaporating, coating or sputtering, and then diffusion heat treatment is carried out.

Wherein, the substance containing Dy can be a Dy metal, a Dy-containing compound (for example a Dy fluoride), or a Dy-containing alloy.

Wherein, the substance containing Tb can be a Tb metal, a Tb-containing compound (for example a Tb fluoride), or a Tb-containing alloy.

Wherein, the temperature of the diffusion heat treatment can be 850-980° C., for example 850° C.

Wherein, the time of the diffusion heat treatment can be 12-48 h, for example 24h.

Wherein, after the grain boundary diffusion treatment, a heat treatment can be further carried out. The temperature of the heat treatment can be 500° C. The time of the heat treatment can be 3 h. The environment of the heat treatment can be a vacuum condition of $9\times10^{-3}$ Pa.

The present disclosure further provides an R-T-B based permanent magnet material prepared by the method described above.

The present disclosure further provides an application of the R-T-B based permanent magnet material as an electronic component in an electric motor.

Wherein, the application is preferably an application as an electronic component in a motor with a speed of 3000-7000 rpm and/or an operating temperature of 80-180° C., for example an application as an electronic component in a high speed motor and/or household appliances.

The present disclosure further provides a motor comprising the R-T-B based permanent magnet material as previously described.

Based on the common sense in the field, the preferred conditions of the preparation methods can be combined arbitrarily to obtain preferred examples of the present disclosure.

The reagents and raw materials used in the present disclosure are commercially available.

The positive progress of the present invention is as follows:

(1) The R-T-B based permanent magnet material in the present disclosure has excellent performance with Br≥12.78 kGs and Hcj≥29.55 kOe under the condition that the content of heavy rare earth elements in permanent magnet material is 3.0-4.5 wt. %; as well as Br≥13.06 kGs and Hcj≥26.31 kOe under the condition that the content of heavy rare earth elements in permanent magnet material is 1.5-2.5 wt. %, which can achieve the simultaneous improvement of Br and Hcj.

(2) The preparation of R-T-B based permanent magnet material in the present disclosure achieves low temperature sintering, which reduces energy consumption, and after sintering and cooling, $R_x$—($B_{1-a-b-c}$—$Ga_a$—$Cu_b$-$T_e$)$_y$ crystalline phase is formed at the grain boundary, which improves the grain boundary morphology and forms a continuous grain boundary channel, further improving the magnet performance.

(3) The addition of Tb to the magnet in present disclosure ensures that the magnet has an excellent temperature coefficient, and during the diffusion of Dy, part of Tb enters the grain boundary from main phase, which can improve Hcj while avoiding lowering Br as much as possible.

DETAILED DESCRIPTION OF THE PREFERRED EMBODIMENT

Figure 1:
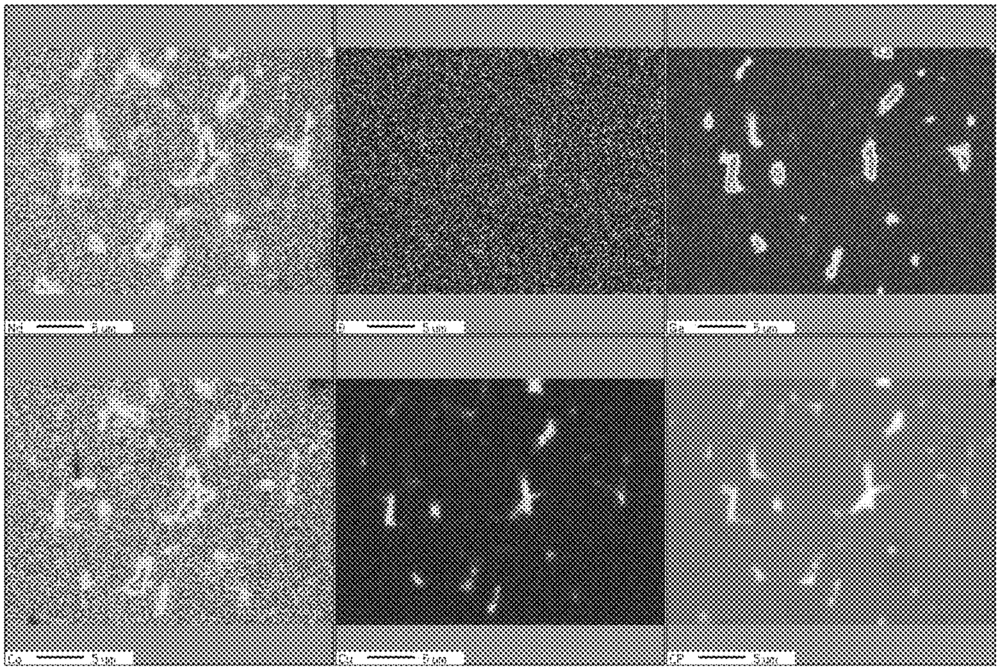
FIG. 1 shows the $R_x$—($B_{1-a-b-c}$—$Ga_a$—$Cu_b$-$T_c$)$_y$ intergranular phase formed by the elements Nd, B, Ga, Co and Cu at the grain boundaries in the magnet prepared in Example 2.

The following examples further illustrate the present disclosure, but the present disclosure is not limited thereto. Experiment methods in which specific conditions are not indicated in the following examples are selected according to conventional methods and conditions, or according to the product specification. In the following tables, wt. % refer to the mass percentage of the components in the raw material composition of R-T-B based permanent magnet material, "/" indicates that the element is not added. "Br" refers to remanence, "Hcj" refers to intrinsic coercivity.

Example 1

The R-T-B based permanent magnet material was prepared as follows.

(1) Melting process: according to the formulation shown in Example 1 in Table 1, the prepared raw materials were put into a crucible made of alumina and vacuum melted in a high-frequency vacuum induction melting furnace and in a vacuum of $5\times10^{-2}$ Pa at a temperature of 1500° C. or less.

(2) Casting process: after vacuum melting, Ar gas was introduced into the melting furnace to make the air pressure reach 55,000 Pa, then casting was carried out, and cooled at a cooling rate of $10^{2}$° C./s–$10^{4}$° C./s to obtain a quench alloy.

(3) Hydrogen decrepitation process: the furnace for hydrogen decrepitation where the quench alloy was placed was evacuated at room temperature, and then hydrogen gas of 99.9% purity was introduced into the furnace for hydrogen decrepitation to maintain the hydrogen pressure at 0.15 MPa; after sufficient hydrogen absorption, it was sufficiently dehydrogenated by heating up while vacuum-pumping; then it was cooled and the powder after hydrogen decrepitation was taken out.

(4) Micro-pulverization process: the powder after decrepitation was pulverized by jet mill for 3 hours under nitrogen atmosphere with oxidizing gas content of 150 ppm or less and under the condition of the pressure of 0.38 MPa in the pulverization chamber, and fine powder was obtain. The oxidizing gas refers to oxygen or moisture.

(5) Zinc stearate was added to the powder after jet mill pulverization, and the addition amount of zinc stearate was 0.12% by weight of the mixed powder, and then it was mixed thoroughly with a V-mixer.

(6) Magnetic field forming process: a rectangular oriented magnetic field forming machine was used to conduct primary forming of the above-mentioned powder with zinc stearate into a cube with sides of 25 mm in an orientation magnetic field of 1.6T and a forming pressure of 0.35 ton/cm$^2$; after the primary forming, it was demagnetized in a magnetic field of 0.2T. In order to prevent the formed body after the primary forming from contacting with air, it was sealed, and then secondary forming was carried out at a pressure of 1.3 ton/cm$^2$ using a secondary forming machine (isostatic forming machine).

(7) Sintering process: each formed body was moved to a sintering furnace for sintering, the sintering was maintained under a vacuum of $5\times10^{-3}$ Pa and at a temperature of/300° C. and 600° C. for 1 hour, respectively; then sintered at a temperature of 1030° C. for 3 hours, then sintered at a temperature of 1040° C. for hours; and then Ar gas was introduced to make the air pressure reach 0.1 MPa, and cooled at a cooling rate of 10° C./min to 100° C.

(8) Grain boundary diffusion treatment process: the sintered body was processed into a magnet with a diameter of 20 mm and a thickness of 5 mm, and the thickness direction is the magnetic field orientation direction, after the surface was cleaned, the diffusion raw materials containing Dy metal were coated onto the magnet separately, and the coated magnet was dried, and the magnet with Dy elements attached to the surface was diffusion heat treated at 850° C. for 24 hours in a high-purity Ar gas atmosphere. After the treatment, it was cooled to room temperature.

(9) Heat treatment process: the sintered body was heat treated at a temperature of 500° C.

TABLE 1

Formulation for the raw material compositions of the R-T-B based permanent magnet materials (wt. %)

| No. | Nd | Tb | Dy | Cu | Co | Ga | B | Fe | Al | P | Sn |
|---|---|---|---|---|---|---|---|---|---|---|---|
| Example 1 | 24.5 | 4 | / | 0.08 | 2 | 0.3 | 0.95 | remainder | / | / | / |
| Example 2 | 26.5 | 3.6 | / | 0.06 | 1.6 | 0.2 | 0.98 | remainder | / | / | / |
| Example 3 | 27.5 | 3.2 | / | 0.04 | 1.4 | 0.1 | 1 | remainder | / | / | / |
| Example 4 | 28 | 3 | 0.5 | 0.01 | 1 | 0.05 | 1.05 | remainder | / | / | / |
| Example 5 | 28.5 | 2 | / | 0.08 | 2 | 0.3 | 0.95 | remainder | / | / | / |
| Example 6 | 29.7 | 1.8 | / | 0.06 | 1.6 | 0.2 | 0.98 | remainder | / | / | / |
| Example 7 | 30.3 | 1.5 | / | 0.04 | 1 | 0.1 | 1 | remainder | / | / | / |
| Example 8 | 30.5 | 1.5 | 0.5 | 0.01 | 0.8 | 0.05 | 1.05 | remainder | / | / | / |
| Comparative Example 1 | 26.5 | 3.6 | / | 0.06 | 1.6 | 0.2 | 0.98 | remainder | 0.3 | / | / |
| Comparative Example 2 | 26.5 | 3.6 | / | 0.06 | 1.6 | / | 0.98 | remainder | / | 0.2 | / |
| Comparative Example 3 | 26.5 | 3.6 | / | 0.06 | 1.6 | / | 0.98 | remainder | / | / | 0.2 |
| Comparative Example 4 | 29.7 | 1.8 | / | 0.06 | 1.6 | / | 0.98 | remainder | / | 0.2 | / |
| Comparative Example 5 | 29.7 | 1.8 | / | 0.06 | 1.6 | / | 0.98 | remainder | / | / | 0.2 |
| Comparative Example 6 | 26.5 | 3.6 | / | 0 | 1.6 | 0.2 | 0.98 | remainder | / | / | / |
| Comparative Example 7 | 26.5 | 3.6 | / | 1 | 1.6 | 0.2 | 0.98 | remainder | / | / | / |
| Comparative Example 8 | 26.5 | 3.6 | / | 0.06 | 1.6 | 0.02 | 0.98 | remainder | / | / | / |
| Comparative Example 9 | 26.5 | 3.6 | / | 0.06 | 1.6 | 0.35 | 0.98 | remainder | / | / | / |

Examples 2-8, Comparative Examples 1-9

The R-T-B based permanent magnet materials corresponding to Examples 2-8 and Comparative Examples 1-9 were prepared according to the formulations shown in Table 1, wherein, the preparation processes in Examples 2-4, Comparative Examples 1-3, and Comparative Examples 6-9 were the same as Example 1.

The preparation processes in Examples 5-8 and Comparative Examples 4-5 were the same as Example 1 except for the following differences: the process of grain boundary diffusion treatment: the sintered body was processed into a magnet with a diameter of 20 mm and a thickness of 5 mm, and the direction of the thickness is the direction of magnetic field orientation; after the surface was cleaned, the diffusion raw materials containing Tb metal were coated on the magnet through a full spray, respectively, and the coated magnet was dried; then in a high-purity Ar gas atmosphere, the magnet with Tb elements attached to the surface was diffusion heat treated at 850° C. for 24 hours. After the treatment, it was cooled to room temperature.

Comparative Examples 10-11

The raw materials of Example 2 were taken, and the preparation was carried out according to the process conditions shown in Table 2, other process conditions are the same as Example 2.

TABLE 2

| No. | First stage sintering Temperature ° C. | First stage sintering Time h | Second stage sintering Temperature ° C. | Second stage sintering Heating rate ° C./min | Second stage sintering Time h | Cooling Rate ° C./min | Cooling Temperature of end point ° C. | Composition of $R_x-(B_{1-a-b-c}-Ga_a-Cu_b-T_c)_y$ (at %) |
|---|---|---|---|---|---|---|---|---|
| Example 2 | 1030 | 3 | 1040 | 10 | 1 | 10 | 100 | $R_{56.9}-(B_{0.02}-Ga_{0.23}-Cu_{0.11}-T_{0.64})_{43.1}$ |
| Comparative Example 10 | 1045 | 4 | — | — | — | 5 | 100 | $R_{73.3}-(Ga_{0.03}-Cu_{0.08}-T_{0.89})_{26.7}$ |
| Comparative Example 11 | 1030 | 4 | — | — | — | 5 | 100 | $R_{55.1}-(Ga_{0.16}-Cu_{0.05}-T_{0.79})_{44.9}$ |

As shown in Table 2, the required grain boundary phase was not generated in the permanent magnet material prepared by using only one-stage sintering at high temperature or only one-stage sintering at low temperature, and the B at the grain boundary was not diffusely distributed, but formed a B-rich phase which was not conducive to magnetic properties, which reduced the performance of the permanent magnet material.

Effectiveness Example

(1) Grain Boundary Structure of Magnets

The magnetic properties and compositions of the R-T-B based permanent magnet materials prepared in the Examples and the Comparative Examples were measured, and the grain boundary structures of the magnets were observed by FE-EPMA.

Figure 2:
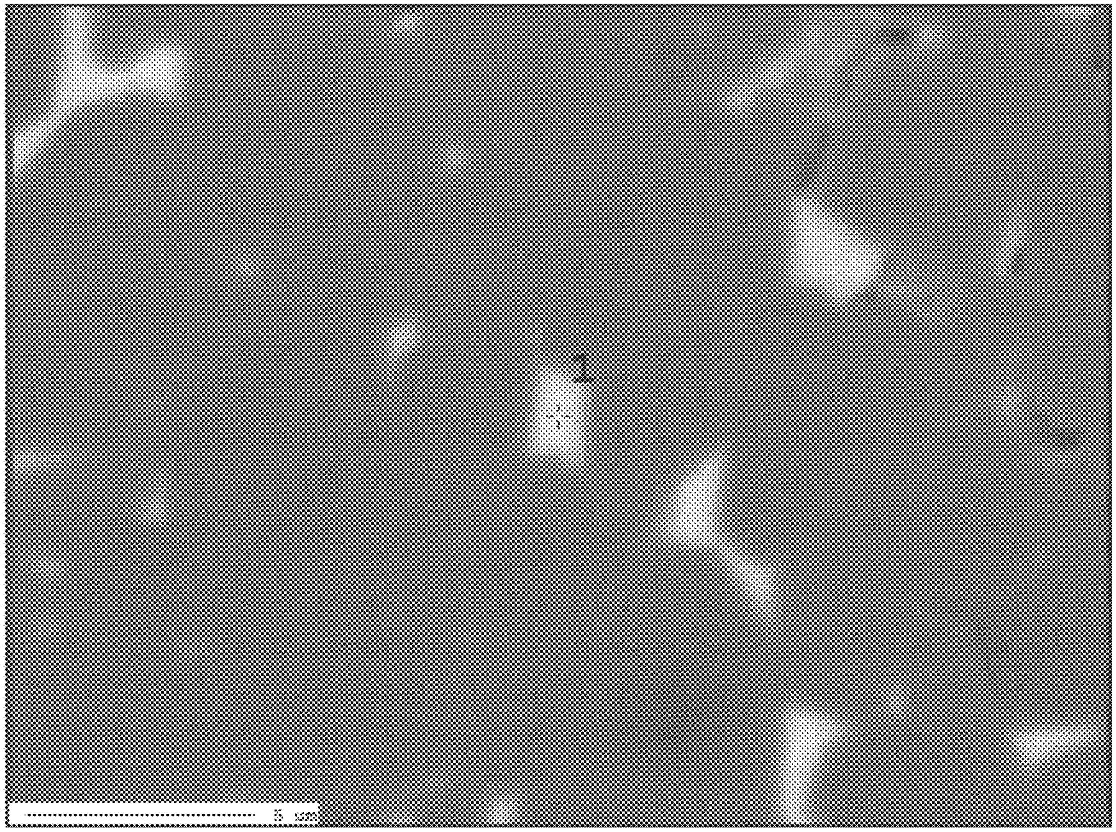
FIG. 2 shows the magnet prepared in Example 2, wherein the position marked by number 1 can be used as an analysis point for detection of grain boundary phase composition.

FE-EPMA inspection: the vertical orientation surfaces of the permanent magnet material were polished and inspected using a field emission electron probe microanalyzer (FE-EPMA) (Japan Electronics Company (JEOL), 8530F). The distribution of Ga, Cu, T(Fe+Co), R(Nd+Tb+Dy), B and other elements in the magnet was first determined by FE-EPMA face scan (as shown in FIG. 1), and then the content of Cu, Ga and other elements in the key phase was determined by FE-EPMA single-point quantitative analysis (e.g., the analysis point shown in FIG. 2), with the test conditions of accelerating voltage 15 kv and probe beam current 50 nA.

The results of FE-EPMA inspection are shown in Table 3 below.

TABLE 3

| | Composition of $R_x - (B_{1-a-b-c} - Ga_a - Cu_b - T_c)_y$ (at %) | | | | | |
|---|---|---|---|---|---|---|
| No. | Grain boundary phase | R | B | Ga | Cu | T(Fe + Co) |
| Example 1 | $R_{55.6} - (B_{0.01} - Ga_{0.235} - Cu_{0.115} - T_{0.64})_{44.4}$ | 55.6 | 0.444 | 10.43 | 5.106 | 28.416 |
| Example 2 | $R_{56.9} - (B_{0.02} - Ga_{0.23} - Cu_{0.11} - T_{0.64})_{43.1}$ | 56.9 | 0.862 | 9.913 | 4.741 | 27.584 |
| Example 3 | $R_{59} - (B_{0.02} - Ga_{0.24} - Cu_{0.1} - T_{0.64})_{41}$ | 59 | 0.82 | 9.84 | 4.1 | 26.24 |
| Example 4 | $R_{59.1} - (B_{0.02} - Ga_{0.23} - Cu_{0.11} - T_{0.64})_{40.9}$ | 59.1 | 0.818 | 9.407 | 4.499 | 26.176 |
| Exaniple 5 | $R_{56.7} - (B_{0.02} - Ga_{0.23} - Cu_{0.1} - T_{0.65})_{43.3}$ | 56.7 | 0.866 | 9.959 | 4.33 | 28.145 |
| Example 6 | $R_{57} - (B_{0.02} - Ga_{0.23} - Cu_{0.1} - T_{0.65})_{43}$ | 57 | 0.86 | 9.89 | 4.3 | 27.95 |
| Example 7 | $R_{58.6} - (B_{0.02} - Ga_{0.23} - Cu_{0.11} - T_{0.64})_{41.4}$ | 58.6 | 0.828 | 9.522 | 4.554 | 26.496 |
| Example 8 | $R_{59.5} - (B_{0.023} - Ga_{0.23} - Cu_{0.103} - T_{0.644})_{40.5}$ | 59.5 | 0.932 | 9.315 | 4.172 | 26.082 |
| Comparative Example 1 | Not generated | / | / | / | / | / |
| Comparative Example 2 | Not generated | / | / | / | / | / |
| Comparative Example 3 | Not generated | / | / | / | / | / |
| Comparative Example 4 | Not generated | / | / | / | / | / |
| Comparative Example 5 | Not generated | / | / | / | / | / |
| Comparative Example 6 | $R_{58} - (B_{0.01} - Ga_{0.2} - T_{0.79})_{42}$ | 58 | 0.42 | 8.4 | / | 33.18 |
| Comparative Example 7 | $R_{47} - (Ga_{0.15} - Cu_{0.57} - T_{0.28})_{53}$ | 47 | / | 7.95 | 30.21 | 14.84 |
| Comparative Example 8 | $R_{63} - (B_{0.01} - Cu_{0.11} - T_{0.88})_{37}$ | 61 | 0.37 | / | 4.07 | 32.56 |
| Comparative Example 9 | $R_{58.3} - (Ga_{0.26} - Cu_{0.08} - T_{0.66})_{41.7}$ | 58.3 | / | 10.84 | 3.336 | 27.522 |
| Comparative Example 10 | $R_{73.3} - (Ga_{0.03} - Cu_{0.08} - T_{0.89})_{26.7}$ | 73.3 | / | 0.801 | 2.136 | 23.763 |
| Comparative Example 11 | $R_{55.1} - (Ga_{0.16} - Cu_{0.05} - T_{0.79})_{44.9}$ | 55.1 | / | 7.184 | 2.245 | 35.471 |

Note:
"/" indicates that the element is not comprised.

As shown in Table 3, both the change of species of low melting point element and the change of the amount of low melting point element have significant effects on the crystalline phase formed at the grain boundaries. When the species and/or the amount of low melting point element is not within the scope of this disclosure, it is difficult to form the $R_x$—($B_{1-a-b-c}$—$Ga_a$—$Cu_b$-$T_c$)$_y$ crystalline phase at the grain boundaries that can improve the performance of the permanent magnet material.

(2) Magnetic property evaluation: the magnetic properties were tested using the NIM-10000H type BH bulk rare earth permanent magnet nondestructive measurement system in National Institute of Metrology, China.

The magnetic property test results are shown in Table 4 below.

TABLE 4

| No. | RH (wt %) | Br (kGs) | Hcj (kOe) | Br Temperature coefficient 100° C. |
|---|---|---|---|---|
| Example 1 | 4.48 | 14.23 | 29.55 | 0.10 |
| Example 2 | 4.13 | 13.51 | 31.34 | 0.10 |
| Example 3 | 3.7 | 13.32 | 30.87 | 0.10 |
| Example 4 | 3.98 | 12.78 | 32.53 | 0.10 |
| Comparative Example 1 | 4.13 | 13.21 | 28.83 | 0.11 |
| Comparative Example 2 | 4.12 | 13.30 | 24.57 | 0.12 |
| Comparative Example 3 | 4.15 | 13.02 | 23.59 | 0.13 |
| Comparative Example 6 | 4.15 | 13.51 | 26.22 | 0.11 |
| Comparative Example 7 | 4.07 | 13.25 | 25.60 | 0.11 |
| Comparative Example 8 | 4.11 | 13.51 | 26.46 | 0.11 |
| Comparative Example 9 | 4.13 | 13.26 | 28.11 | 0.11 |

TABLE 4-continued

| No. | RH (wt %) | Br (kGs) | Hcj (kOe) | Br Temperature coefficient 100° C. |
|---|---|---|---|---|
| Comparative Example 10 | 4.13 | 13.46 | 27.10 | 0.11 |
| Comparative Example 11 | 4.13 | 13.36 | 29.48 | 0.11 |
| Example 5 | 2.3 | 14.10 | 26.39 | 0.11 |
| Example 6 | 2.25 | 13.64 | 27.40 | 0.11 |
| Example 7 | 1.99 | 13.60 | 26.31 | 0.11 |
| Example 8 | 2.5 | 13.06 | 28.47 | 0.11 |
| Comparative Example 4 | 2.1 | 13.43 | 24.32 | 0.12 |
| Comparative Example 5 | 2.12 | 13.11 | 21.14 | 0.13 |

As shown in Table 4, the R-T-B based permanent magnet material in the present disclosure has excellent performance with Br ⩾ 12.78 kGs and Hcj ⩾ 29.55 kOe under the condition that the content of heavy rare earth elements in permanent magnet material is 3.0-4.5 wt. %; as well as Br≥13.06 kGs and Hcj≥26.31 kOe under the condition that the content of heavy rare earth elements in permanent magnet material is 1.5-2.5 wt. %, which can achieve the simultaneous improvement of Br and Hcj.

Combined with Table 3, it can be seen that the formation of $R_x$—($B_{1-a-b-c}$—$Ga_a$—$Cu_b$-$T_c$)$_y$ crystalline phase is beneficial to the improvement of the performance of the permanent magnet material, the inventors speculate that the crystalline phase may improve the grain boundary morphology by increasing the wettability of the grain boundary, and provide a continuous grain boundary channel for the diffusion process, thus the improvement of Hcj is achieved and the permanent magnet material with high Brand high Hcj is further obtained.

(3) Component determination: the components were determined using high-frequency inductively coupled plasma emission spectrometer (ICP-OES). The following Table 5 shows the results of the component determination.

TABLE 5

| Results of the component determination (wt. %) | | | | | | | | | | | |
|---|---|---|---|---|---|---|---|---|---|---|---|
| No. | Nd | Tb | Dy | Cu | Co | Ga | B | Fe | Al | P | Sn |
| Example 1 | 24.46 | 3.98 | 0.50 | 0.07 | 2.00 | 0.30 | 0.95 | remainder | / | / | / |
| Example 2 | 26.40 | 3.61 | 0.52 | 0.06 | 1.58 | 0.20 | 0.98 | remainder | / | / | / |
| Example 3 | 27.39 | 3.19 | 0.51 | 0.05 | 1.39 | 0.10 | 0.99 | remainder | / | / | / |
| Example 4 | 27.94 | 2.99 | 0.99 | 0.01 | 1.00 | 0.05 | 1.04 | remainder | / | / | / |
| Example 5 | 28.36 | 2.30 | / | 0.08 | 2.00 | 0.30 | 0.95 | remainder | / | / | / |
| Example 6 | 29.58 | 2.25 | / | 0.06 | 1.60 | 0.20 | 0.98 | remainder | / | / | / |
| Example 7 | 30.24 | 1.99 | / | 0.05 | 0.99 | 0.10 | 0.99 | remainder | / | / | / |
| Example 8 | 30.36 | 2.01 | 0.49 | 0.01 | 0.79 | 0.05 | 1.04 | remainder | / | / | / |
| Comparative Example 1 | 26.39 | 3.60 | 0.53 | 0.06 | 1.60 | 0.20 | 0.98 | remainder | 0.29 | / | / |
| Comparative Example 2 | 26.41 | 3.60 | 0.52 | 0.06 | 1.58 | / | 0.98 | remainder | / | 0.20 | / |
| Comparative Example 3 | 26.37 | 3.60 | 0.55 | 0.06 | 1.60 | / | 0.97 | remainder | / | / | 0.20 |
| Comparative Example 4 | 29.55 | 2.10 | / | 0.06 | 1.59 | / | 0.98 | remainder | / | 0.20 | / |
| Comparative Example 5 | 29.60 | 2.12 | / | 0.06 | 1.60 | / | 0.98 | remainder | / | / | 0.20 |
| Comparative Example 6 | 26.40 | 3.62 | 0.53 | 0.00 | 1.59 | 0.20 | 0.98 | remainder | / | / | / |
| Comparative Example 7 | 26.36 | 3.58 | 0.49 | 0.99 | 1.60 | 0.20 | 0.97 | remainder | / | / | / |
| Comparative Example 8 | 26.39 | 3.60 | 0.51 | 0.05 | 1.60 | 0.02 | 0.98 | remainder | / | / | / |

TABLE 5-continued

| Results of the component determination (wt. %) | | | | | | | | | | | |
|---|---|---|---|---|---|---|---|---|---|---|---|
| No. | Nd | Tb | Dy | Cu | Co | Ga | B | Fe | Al | P | Sn |
| Comparative Example 9 | 26.42 | 3.59 | 0.54 | 0.06 | 1.58 | 0.35 | 0.98 | remainder | / | / | / |

Note:
"/"indicates that the element is not comprised.

What is claimed is:

1. A R-T-B based permanent magnet material, wherein, the R-T-B based permanent magnet material comprises the following components in mass percentage: R: 28.5-33.0 wt. %; RH: 1.5-4.5 wt. %; Cu: 0-0.08 wt. %, but not 0 wt. %; Co: 0.5-2.0 wt. %; Ga: 0.05-0.30 wt. %; B: 0.95-1.05 wt. %; and the remainder being Fe and unavoidable impurities; wherein: R is a rare earth element and comprises at least Nd and RH; and RH is a heavy rare earth element;

wherein, the R-T-B based permanent magnet material comprises $R_2T_{14}B$ grains and grain boundary phase among $R_2T_{14}B$ grains, the composition of the grain boundary phase is $R_x$—$(B_{1-a-b-c}$—$Ga_a$—$Cu_b$-$T_c)_y$, wherein: T is Fe and Co, 2b<a<3.5b, 1/2c<a+b, 50 at %<x<65 at %, 35 at %<y<50 at %, and at % refers to the atomic percentage of each element in the grain boundary phase.

2. The R-T-B based permanent magnet material according to claim 1, wherein, a is 0.23-0.24, and the a refers to the atomic ratio of Ga in the elements of "B, Ga, Cu, Fe and Co";

or, b is 0.1-0.115, and the b refers to the atomic ratio of Cu in the elements of "B, Ga, Cu, Fe and Co";

or, c is 0.64-0.65, and the c refers to the atomic ratio of "Fe and Co" in the elements of "B, Ga, Cu, Fe and Co".

3. The R-T-B based permanent magnet material according to claim 1, wherein, the $R_x$—$(B_{1-a-b-c}$—$Ga_a$—$Cu_b$-$T_c)_y$ is $R_{55.6}$—$(B_{0.01}$—$Ga_{0.235}$—$Cu_{0.115}$-$T_{0.64})_{44.4}$, $R_{56.9}$—$(B_{0.02}$—$Ga_{0.23}$—$Cu_{0.11}$-$T_{0.64})_{43.1}$, $R_{59}$—$(B_{0.02}$—$Ga_{0.24}$—$Cu_{0.1}$-$T_{0.64})_{41}$, $R_{59.1}$—$(B_{0.02}$—$Ga_{0.23}$—$Cu_{0.11}$-$T_{0.64})_{40.9}$, $R_{56.7}$—$(B_{0.02}$—$Ga_{0.23}$—$Cu_{0.1}$-$T_{0.65})_{43.3}$, $R_{57}$—$(B_{0.02}$—$Ga_{0.23}$—$Cu_{0.1}$-$T_{0.65})_{43}$, $R_{58.6}$—$(B_{0.02}$—$Ga_{0.23}$—$Cu_{0.11}$-$T_{0.64})_{41.4}$ or $R_{59.5}$—$(B_{0.023}$—$Ga_{0.23}$—$Cu_{0.103}$-$T_{0.644})_{40.5}$.

4. The R-T-B based permanent magnet material according to claim 1, wherein, R further comprises Pr.

5. The R-T-B based permanent magnet material according to claim 1, wherein, RH is selected from the group consisting of Dy and Tb;

or, RH is Tb, the content of Tb is 1.5-4.5 wt. %;

or, RH comprises Dy, the content of Dy is 0.45-1.0 wt. %; and the percentage refers to mass percentage in the R-T-B based permanent magnet material.

6. The R-T-B based permanent magnet material according to claim 1, wherein, the content of Cu is 0.01-0.08 wt. %, 0.04-0.08 wt. % or 0.05-0.08 wt. %, and the percentage refers to mass percentage in the R-T-B based permanent magnet material.

7. The R-T-B based permanent magnet material according to claim 1, wherein, the content of Ga is 0.05 or 0.1-0.3 wt. %, and the percentage refers to mass percentage in the R-T-B based permanent magnet material.

8. The R-T-B based permanent magnet material according to claim 1, wherein, in the R-T-B based permanent magnet material, the R-T-B based permanent magnet material comprises the following components: R 28.5-32.0 wt. %; RH 3.0-4.5 wt. %; Cu 0-0.08 wt. % but not 0 wt. %; Co 1.0-2.0 wt. %; Ga 0.05-0.30 wt. %; B 0.95-1.05 wt. %; the remainder being Fe and unavoidable impurities; and the percentage refers to mass percentage in the R-T-B based permanent magnet material;

or, the R-T-B based permanent magnet material comprises the following components: R 28.5-32.0 wt. %; RH 3.2-4.5 wt. %; Cu 0.04-0.08 wt. %; Co 1.0-2.0 wt. %; Ga 0.10-0.30 wt. %; B 0.95-1.0 wt. %; the remainder being Fe and unavoidable impurities, and the percentage refers to mass percentage in the R-T-B based permanent magnet material;

or, the R-T-B based permanent magnet material comprises the following components: Nd 24.4-28.0 wt. %; Tb 3.0-4.0 wt. %; Dy 0.5-1.0 wt. %; Cu 0.01-0.08 wt. %; Co 1.0-2.0 wt. %; Ga 0.05-0.30 wt. %; B 0.95-1.05 wt. %; the remainder being Fe and unavoidable impurities, and the percentage refers to mass percentage in the R-T-B based permanent magnet material;

or, the R-T-B based permanent magnet material comprises the following components: R 30.5-33.0 wt. %; RH >1.5 wt. %; Cu 0-0.08 wt. % but not 0 wt. %; Co 0.78-2.0 wt. %; Ga 0.05-0.30 wt. %; B 0.95-1.05 wt. %; the remainder being Fe and unavoidable impurities, and the percentage refers to mass percentage in the R-T-B based permanent magnet material;

or, the R-T-B based permanent magnet material comprises the following components: R 30.5-33.0 wt. %; RH 1.5-2.5 wt. %; Cu 0.04-0.08 wt. %; Co 0.78-1.6 wt. %; Ga 0.10-0.30 wt. %; B 0.95-1.0 wt. %; the remainder being Fe and unavoidable impurities, and the percentage refers to mass percentage in the R-T-B based permanent magnet material;

or, the R-T-B based permanent magnet material comprises the following components: Nd 28.0-30.5 wt. %; Tb 1.5-2.5 wt. %; Dy 0-0.5 wt. %; Cu 0.01-0.08 wt. %; Co 0.78-2.0 wt. %; Ga 0.05-0.30 wt. %; B 0.95-1.05 wt. %; the remainder being Fe and unavoidable impurities, and the percentage refers to mass percentage in the R-T-B based permanent magnet material.

9. An electronic component in a motor comprising the R-T-B based permanent magnet material according to claim 1.

10. A motor, wherein, the motor comprises the R-T-B based permanent magnet material according to claim 1.

11. A preparation method for an R-T-B based permanent magnet material according to claim 1, wherein, the preparation method for the R-T-B based permanent magnet material comprises the following steps: molten liquid of the raw material composition of R-T-B based permanent magnet material is subjected to casting, decrepitation, pulverization, forming, sintering and grain boundary diffusion treatment, and the R-T-B based permanent magnet material is obtained; wherein: the sintering is carried out sequentially in the following steps: first stage sintering, second stage sintering and cooling; the temperature of the first stage sintering is ≤1040° C.; the second stage sintering is carried out at an increased temperature on the basis of the first stage sintering with a temperature difference of ≥5-10° C., the rate of temperature increase is ≥5° C./min, and the time of the second stage sintering is ≤1 h; the rate of cooling is ≥7° C./min and the end point of cooling is ≤100° C.;

wherein the raw material composition of the R-T-B based permanent magnet material comprises the following components in mass percentage: R: 28.5-32.5 wt. %; RH: 1.2-4.5 wt. %; Cu: 0-0.08 wt. %, but not 0 wt. %; Co: 0.5-2.0 wt. %; Ga: 0.05-0.30 wt. %; B: 0.95-1.05 wt. %; the remainder being Fe and unavoidable impurities; wherein: R is a rare earth element and comprises at least Nd and RH; RH is a heavy rare earth element.

12. The preparation method for an R-T-B based permanent magnet material according to claim 11, wherein, the molten liquid of the raw material composition of R-T-B based permanent magnet material is prepared according to the following method: melting in a high frequency vacuum induction melting furnace;

or, the process of the casting is carried out according to the following step: in an Ar gas atmosphere, cooling at a rate of $10^{2}$° C./sec-$10^{4}$° C./sec;

or, the process of the decrepitation is carried out according to the following steps: hydrogen absorption, dehydrogenation and cooling treatment;

or, the method of forming is a magnetic field forming method or a hot pressing and heat deformation method;

or, preheating is further carried out before the first stage sintering, the temperature of the preheating is 300-600° C.; the time of the preheating is 1-2 h;

or, the temperature of the first stage sintering is 1000-1030° C.;

or, the time of the first stage sintering is ≥2 h;

or, in the second stage sintering, the temperature difference is ≥5-10° C. and ≤20° C.;

or, the time of the second stage sintering is 1 h;

or, in the process of sintering, the rate of cooling is 10° C./min;

or, in the process of sintering, the end point of cooling is 100° C.;

or, Ar gas is introduced before the cooling to bring the air pressure to 0.1 MPa;

or, a heat treatment is further carried out after the grain boundary diffusion treatment.

13. The preparation method for an R-T-B based permanent magnet material according to claim 11, wherein, the grain boundary diffusion treatment is carried out in the following step: a substance containing Dy or Tb is attached to the surface of the R-T-B based permanent magnet material by vaporizing, coating or sputtering, and diffusion heat treatment is carried out; the temperature of the diffusion heat treatment is 850-980° C., the time of the diffusion heat treatment is 12-48 h.

14. The preparation method for the R-T-B based permanent magnet material according to claim 11, wherein, R further comprises Pr;

or, RH is selected from the group consisting of Dy and Tb;

or, RH comprises Tb, the content of Tb is 1.2-4.5 wt. %, and the percentage refers to mass percentage in the raw material composition of the R-T-B based permanent magnet material;

or, RH comprises Dy, the content of Dy is 0-0.5 wt. %;

or, the content of Cu is 0.01-0.08 wt. %, 0.04-0.08 wt. % or 0.05-0.08 wt. %, and the percentage refers to mass percentage in the raw material composition of the R-T-B based permanent magnet material;

or, the content of Ga is 0.05 or 0.1-0.3 wt. %, and the percentage refers to mass percentage in the raw material composition of the R-T-B based permanent magnet material.

15. The preparation method for the R-T-B based permanent magnet material according to claim 11, wherein, the raw material composition of the R-T-B based permanent magnet material comprises the following components: R 28.5-31.5 wt. %; RH 3.0-4.5 wt. %; Cu 0-0.08 wt. %, but not 0 wt. %; Co 1.0-2.0 wt. %; Ga 0.05-0.30 wt. %; B 0.95-1.05 wt. %; the remainder being Fe and unavoidable impurities; and the percentage refers to mass percentage in the raw material composition of the R-T-B based permanent magnet material;

or, the raw material composition of the R-T-B based permanent magnet material comprises the following components: R 28.5-31.5 wt. %, RH 3.2-4.5 wt. %, Cu 0.04-0.08 wt. %, Co 1.0-2.0 wt. %, Ga 0.10-0.30 wt. % and B 0.95-1.0 wt. %; the remainder being Fe and unavoidable impurities, and the percentage refers to mass percentage in the raw material composition of the R-T-B based permanent magnet material;

or, the raw material composition of the R-T-B based permanent magnet material comprises the following components: Nd 24.5-28.0 wt. %, Tb 3.0-4.0 wt. %, Dy 0-0.5 wt. %, Cu 0.01-0.08 wt. %, Co 1.0-2.0 wt. %, Ga 0.05-0.30 wt. % and B 0.95-1.05 wt. %; the remainder being Fe and unavoidable impurities, and the percentage refers to mass percentage in the raw material composition of the R-T-B based permanent magnet material;

or, the raw material composition of the R-T-B based permanent magnet material comprises the following components: R 30.5-32.5 wt. %; RH 1.2-4.5 wt. %; Cu 0-0.08 wt. % but not 0 wt. %; Co 0.8-2.0 wt. %; Ga 0.05-0.30 wt. %; B 0.95-1.05 wt. %; the remainder being Fe and unavoidable impurities, and the percentage refers to mass percentage in the raw material composition of the R-T-B based permanent magnet material;

or, the raw material composition of the R-T-B based permanent magnet material comprises the following components: R 30.5-32.5 wt. %, RH 1.5-2.0 wt. %, Cu 0.04-0.08 wt. %, Co 0.8-1.6 wt. %, Ga 0.10-0.30 wt. % and B 0.95-1.0 wt. %; the remainder being Fe and unavoidable impurities, and the percentage refers to mass percentage in the raw material composition of the R-T-B based permanent magnet material;

or, the raw material composition of the R-T-B based permanent magnet material comprises the following components: Nd 28.5-30.5 wt. %, Tb 1.5-2.0 wt. %, Dy 0-0.5 wt. %, Cu 0.01-0.08 wt. %, Co 0.8-2.0 wt. %, Ga 0.05-0.30 wt. % and B 0.95-1.05 wt. %; the remainder being Fe and unavoidable impurities, and the percentage refers to mass percentage in the raw material composition of the R-T-B based permanent magnet material.

* * * * *